United States Patent
Junk et al.

(10) Patent No.: US 12,023,631 B2
(45) Date of Patent: Jul. 2, 2024

(54) GAS SEPARATION ARTICLES COMPOSED OF AMORPHOUS CROSSLINKED FLUORINATED COPOLYMERS AND METHODS OF MAKING AND USING THEREOF

(71) Applicant: Chromis Fiberoptics, Inc., Warren, NJ (US)

(72) Inventors: Christopher P. Junk, Wilmington, DE (US); Whitney Ryan White, Watchung, NJ (US)

(73) Assignee: Chromis Fiberoptics, Inc., Warren, NJ (US)

( * ) Notice: Subject to any disclaimer, the term of this patent is extended or adjusted under 35 U.S.C. 154(b) by 405 days.

(21) Appl. No.: 17/228,134

(22) Filed: Apr. 12, 2021

(65) Prior Publication Data

US 2021/0316255 A1 Oct. 14, 2021

Related U.S. Application Data

(60) Provisional application No. 63/009,112, filed on Apr. 13, 2020, provisional application No. 63/009,114, filed on Apr. 13, 2020.

(51) Int. Cl.

| | | |
|---|---|---|
| *B01D 53/22* | (2006.01) | |
| *B01D 67/00* | (2006.01) | |
| *B01D 69/12* | (2006.01) | |
| *B01D 71/32* | (2006.01) | |
| *B01D 71/76* | (2006.01) | |
| *C08F 214/18* | (2006.01) | |
| *C09D 127/12* | (2006.01) | |

(52) U.S. Cl.
CPC ........... *B01D 71/32* (2013.01); *B01D 53/228* (2013.01); *B01D 67/0006* (2013.01); *B01D 69/125* (2013.01); *B01D 71/76* (2013.01); *C08F 214/184* (2013.01); *C09D 127/12* (2013.01); *B01D 2256/245* (2013.01); *B01D 2257/504* (2013.01); *B01D 2323/081* (2022.08); *B01D 2323/30* (2013.01); *B01D 2323/345* (2013.01)

(58) Field of Classification Search
CPC ........... B01D 69/125; B01D 2256/245; B01D 2323/345; B01D 67/0006; B01D 2323/08; B01D 2257/504; B01D 53/228; B01D 71/76; B01D 2323/30; B01D 71/32; C08F 214/184; C09D 127/12
See application file for complete search history.

(56) References Cited

U.S. PATENT DOCUMENTS

| | | | |
|---|---|---|---|
| 4,200,538 A | 4/1980 | Seita et al. | |
| 5,498,657 A | 3/1996 | Sugiyama et al. | |
| 5,589,557 A | 12/1996 | Navarrini et al. | |
| 5,646,223 A | 7/1997 | Navarrini et al. | |
| 5,726,247 A * | 3/1998 | Michalczyk | ........ C04B 41/4842 |
| | | | 525/326.4 |
| 6,677,175 B2 * | 1/2004 | Zhao | ...................... G02B 6/138 |
| | | | 438/42 |
| 7,236,675 B2 * | 6/2007 | Naitou | ................... G02B 1/046 |
| | | | 385/14 |
| 8,119,765 B2 | 2/2012 | Ito | |
| 8,509,577 B2 * | 8/2013 | Liu | ........................ G02B 6/32 |
| | | | 385/27 |
| 8,798,423 B2 * | 8/2014 | Sillard | .............. C03B 37/01211 |
| | | | 385/127 |
| 2002/0144944 A1 * | 10/2002 | Arcella | .............. B01D 67/0093 |
| | | | 210/488 |
| 2005/0182217 A1 | 8/2005 | Kashiwagi et al. | |
| 2010/0056752 A1 | 3/2010 | Okamoto et al. | |
| 2012/0031833 A1 * | 2/2012 | Ho | ......................... B01D 71/70 |
| | | | 210/488 |
| 2012/0118816 A1 * | 5/2012 | Gjoka | ................... B01D 69/125 |
| | | | 106/287.23 |
| 2012/0178834 A1 * | 7/2012 | Linder | ................ H01M 8/1081 |
| | | | 427/372.2 |
| 2018/0333675 A1 * | 11/2018 | Liu | ........................ B01D 69/02 |
| 2019/0329491 A1 | 10/2019 | Yu et al. | |
| 2019/0390081 A1 | 12/2019 | Rolland et al. | |
| 2020/0206691 A1 * | 7/2020 | Jaber | ....................... C08J 5/2231 |
| 2021/0317329 A1 * | 10/2021 | Junk | ..................... B29C 64/124 |
| 2022/0403083 A1 * | 12/2022 | Junk | .................... B01D 53/228 |

OTHER PUBLICATIONS

International Search Report dated Jul. 7, 2021 for International Application No. PCT/US2021/26821.
International Search Report dated Aug. 17, 2021 for International Application No. PCT/US2021/26857.
Yavarri et al. 'Dioxolan-based Perfluoropolymers with Superior Membrane Gas Separation Properties', Macromolecules, 2018, vol. 51, pp. 2489-2497. p. 2490, col. 2, para 2, Figure 1 ;p. 2491, Figure 3a.

* cited by examiner

*Primary Examiner* — Anthony R Shumate

(74) *Attorney, Agent, or Firm* — Thomas | Horstemeyer, LLP

(57) ABSTRACT

Described herein are articles for separating gases. The article includes a selective layer consisting of a crosslinked amorphous fluorinated copolymer containing one or more types of fluorinated ring monomers, with crosslinking between the fluorinated copolymer chains. The crosslinking improves the mechanical properties of the fluoropolymer, thereby permitting use of polymer types which would otherwise be excessively brittle. The resulting crosslinked polymer membranes have superior selectivity and reliability performance compared with previous compositions known to the art. Methods for making and using the article described are also provided.

38 Claims, No Drawings

GAS SEPARATION ARTICLES COMPOSED OF AMORPHOUS CROSSLINKED FLUORINATED COPOLYMERS AND METHODS OF MAKING AND USING THEREOF

CROSS REFERENCE TO RELATED APPLICATIONS

This application claims the benefit of U.S. Provisional Application No. 63/009,112 filed on Apr. 13, 2020 and U.S. Provisional Application No. 63/009,114 filed on Apr. 13, 2020, both of which are incorporated herein by reference in their entireties.

BACKGROUND

Separation of $CO_2$ and chemically similar gases (including $H_2S$ and other water-soluble acid gases) from non-polar gases, including $N_2$, $O_2$, methane, and other hydrocarbons is an important industrial problem. One large-scale application for this type of separation is the decarbonization of effluent gases ("flue gases") in power plants and other combustion devices, which is important for reduction of $CO_2$ emissions related to global warming. Another major application for this type of gas separation is removal of corrosive acid gases, including $CO_2$ and $H_2S$, from a natural gas stream, also known as "natural gas sweetening." There are also a number of important problems that involve the separation of non-acid types of gases, especially including fluorinated refrigerants, for which separation of gases with different global warming potential (GWP) is becoming a significant goal in the effort to reduce climate change.

These types of acid gas separations have historically been accomplished by a variety of methods, including chemical absorption, cryogenic distillation, and membrane separation. Chemical absorption has been extensively developed in the oil and gas industries with "amine scrubbing" technology, in which alkyl amines (such as mono-ethanolamine) form chemical complexes with acid gases, thus removing them from the gas stream [see for example, Bahadori, *Natural Gas Processing: Technology and Engineering Design*, Elsevier, Amsterdam, 2014]. Cryogenic distillation operates on the principle that $CO_2$ has a much higher freezing point than most other combustion effluents (principally nitrogen), so it may be frozen out as a liquid or a solid, leaving the other gases to pass through the system [see for example, Xu, et. al "An Improved $CO_2$ Separation and Purification System Based on Cryogenic Separation and Distillation Theory" Energies 2014, 7, 3484-3502]. Although both chemical absorption and cryogenic distillation are effective methods of capturing $CO_2$, they typically require significant energy input and considerable capital equipment. In the case of alkylamine absorption processes, the amines are typically corrosive and toxic liquids. Also, since these amines have limited functional lifetimes, they must be regularly replaced and properly disposed of. This represents a significant burden in remote operating locations, such as offshore platforms. Consequently, simpler, more energy efficient, and longer-lasting separation methods are desired.

Fluorinated refrigerant gases are typically separated by distillation, which is depends on differences in the boiling point and vapor pressure of the components as the primary separation mechanism. In some cases, however, there are important separation problems wherein the components are azeotropic, or near-azeotropic, so that distillation-based separation methods are impractical. For example, the widely used refrigerant R410a consists of an azeotropic mixture of two components: R32, which has relatively low global warming potential, and R125, which has relatively high global warming potential. In such a case, it is desirable to separate the lower-GWP component for reuse, while separating the higher-GWP component for incineration or other forms of disposal.

Membrane-based gas separation methods operate on the principle of differential permeability of gases through the selective layer of a membrane, which is often composed of polymers. The membrane material in such a separation process is chosen to provide a very high permeability for one or more of the gases, while providing a much lower permeability for the other gases. The mixed gas stream is then introduced on one side of the membrane, and the high permeability gases pass preferentially through the membrane, resulting in a "permeate" gas stream on the other side of the membrane. This permeate stream will be enriched in the high-permeability gases compared with the input gas stream. Meanwhile as the input stream proceeds across the input-side surface of the membrane to the exit of the membrane module, it will become enriched in low-permeability species compared with the input gas stream. This stream is referred to as the "retentate" stream [see for example, Baker, Membrane Technology and Applications, Wiley, West Sussex, 2012].

Because this membrane-based separation requires only a pressure differential across the membrane to operate, it can be accomplished with relatively simple and reliable equipment, typically consisting primarily of a compressor and a membrane module. For the same reason, it typically uses far less power than the above methods of gas separation. Moreover, membrane based methods of gas separation avoid the use of toxic and corrosive materials such as alkyl amines often used in chemical absorption methods, and they typically offer a considerably lower capital cost as well.

Also, since membrane-based separation methods separate components on the basis of their differential permeability in a polymer membrane, their separation characteristics are typically quite different from the separation characteristics of a distillation process. Thus, azeotropic mixtures in which the component gases have substantially different membrane permeabilities may be separable by a membrane method, when they are inseparable by a distillation method. Accordingly, membranes-based separation methods are potentially promising separation methods for certain azeotropic and near-azeotropic mixtures of refrigerants or other gases.

The membranes most commonly used in gas separations are hydrocarbon polymers, including cellulose acetate and polyimides for separation of acid gases from methane [see for example, Xuezhong He in *Encyclopedia of Membranes*, Springer-Verlag, Berlin Heidelberg 2015]. While these hydrocarbon membranes typically display a relatively high selectivity under ideal conditions, their performance is degraded considerably in certain applications by absorbed gases, which can chemically degrade the polymer and/or cause plasticization of the polymer membranes. In the case of natural gas sweetening applications, $CO_2$ is known to plasticize cellulose acetate and polyimide membranes, resulting in reduced $CO_2$ permeability and reduced $CO_2$/$CH_4$ selectivity [Ibid]. This problem typically becomes more acute at elevated pressure and $CO_2$ content.

SUMMARY

Described herein are articles for separating gases. The article includes a selective layer consisting of a crosslinked amorphous fluorinated copolymer containing one or more types of fluorinated ring monomers, with crosslinking between the fluorinated copolymer chains. The crosslinking improves the mechanical properties of the fluoropolymer, thereby permitting use of polymer types which would otherwise be excessively brittle. The resulting crosslinked polymer membranes have superior selectivity and reliability performance compared with previous compositions known to the art. Methods for making and using the article described are also provided.

Other methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not.

As used in the specification and the appended claims, the singular forms "a," "an" and "the" include plural referents unless the context clearly dictates otherwise. Thus, for example, reference to "a fluorinated ring monomer," "a comonomer," or "a copolymer," include, but are not limited to, mixtures or combinations of two or more such fluorinated ring monomers, comonomers, or copolymers, and the like.

The term "gas" as used herein means a gas or a vapor.

The term "polymer" as used herein generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic and atactic symmetries.

The term "highly fluorinated" as used herein means that at least 50% of the available hydrogen bonded to carbon have been replaced by fluorine.

The terms "fully-fluorinated" and "perfluorinated" as used herein are interchangeable and refer to a compound where all of the available hydrogens bonded to carbon have been replaced by fluorines.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms. The term alkyl group can also be a C1 alkyl, C1-C2 alkyl, C1-C3 alkyl, C1-C4 alkyl, C1-C5 alkyl, C1-C6 alkyl, C1-C7 alkyl, C1-C8 alkyl, C1-C9 alkyl, C1-C10 alkyl, and the like up to and including a C1-C24 alkyl.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halide, e.g., fluorine, chlorine, bromine, or iodine. Alternatively, the term "monohaloalkyl" specifically refers to an alkyl group that is substituted with a single halide, e.g. fluorine, chlorine, bromine, or iodine. The term "polyhaloalkyl" specifically refers to an alkyl group that is independently substituted with two or more halides, i.e. each halide substituent need not be the same halide as another halide substituent, nor do the multiple instances of a halide substituent need to be on the same carbon. The term "alkoxyalkyl" specifically refers to an alkyl group that is substituted with one or more alkoxy groups, as described below. The term "aminoalkyl" specifically refers to an alkyl group that is substituted with one or more amino groups. The term "hydroxyalkyl" specifically refers to an alkyl group that is substituted with one or more hydroxy groups. When "alkyl" is used in one instance and a specific term such as "hydroxyalkyl" is used in another, it is not meant to imply that the term "alkyl" does not also refer to specific terms such as "hydroxyalkyl" and the like.

The term "alkenyl" or "olefinic" as used herein is a fluorocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene or olefin is present, or it can be explicitly indicated by the bond symbol C=C. In one aspect, an "alkenyl" or "olefinic" compound can include two carbon-carbon double bonds (e.g., is a diene).

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

All percentages herein are by volume unless otherwise stated. Unless otherwise specified, temperatures referred to herein are based on atmospheric pressure (i.e. one atmosphere).

Described herein are separation articles such as, for example, films, membranes and the like separating at least one component from a gaseous mixture comprising two or more components. The disclosed articles include a "selective layer" that is selectively permeable for the desired component to be separated from the gas mixture. The selective layer is composed of an amorphous crosslinked fluorinated copolymer. Optionally, the article may include other layers which serve various purposes such as, for example, a porous support layer, a "gutter layer," which allows the permeate gas to pass from the selective layer to the porous layer with minimal flow impedance, and a protective layer, which protects the selective layer from fouling. Each component of the separation articles described herein and methods for making and using the same are provided below.

Amorphous Crosslinked Fluorinated Copolymers

The separation articles described herein include one or more amorphous crosslinked fluorinated copolymers. In one aspect, the amorphous crosslinked fluorinated copolymer comprises a plurality of first copolymers and a plurality of crosslinker units covalently bonded to the first polymers. In one aspect, the amorphous crosslinked fluorinated copolymer is produced by (a) copolymerizing one or more fluorinated ring monomers and a crosslinker in the amount of from 0.2 mol % to 40 mol % to produce a first copolymer and (b) crosslinking the first copolymer to produce the amorphous crosslinked fluoropolymer. Described below are the components and methods for making the crosslinked copolymers.

Fluorinated Ring Monomers

In one aspect, the amorphous crosslinked fluorinated copolymers are produced from one more different fluorinated ring monomers. In one aspect, the fluorinated ring monomer includes a five-membered ring. In another aspect, the fluorinated ring monomer includes a six-membered ring. In still another aspect, the fluorinated ring monomer contains a five-membered ring and a six-membered ring, or includes two five-membered rings. Further in this aspect, when the fluorinated ring monomer contains two rings, the rings can be fused to form a bicyclic structure. In another aspect, the fluorinated ring monomer can be perfluorinated.

In another aspect, the fluorinated ring monomer can have an olefinic structure, where the monomer possesses one or more carbon-carbon double bonds. In another aspect, the fluorinated ring monomer can be created through cyclopolymerization of a linear monomer that has an olefin on one end and a vinyl ether on the other. In one aspect, representative fluorinated ring monomers include, but are not limited to, to one or more olefinic compounds shown in Scheme 1 and Scheme 2 below as well as combinations thereof Scheme 1: fluorinated ring monomers containing a single ring

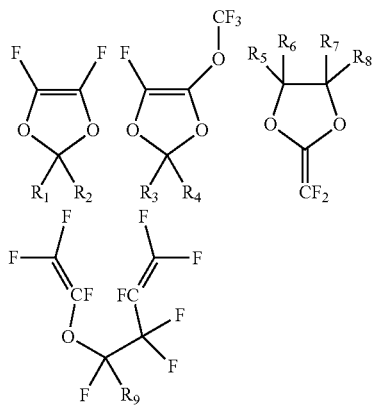

in which:

$R_1$ and $R_2$ are independently F, $CF_3$, $CF_2CF_3$, $CF_2H$, $CF_2CF_2H$, $CFHCF_3$, $CFHCF_2H$;

$R_3$ and $R_4$ are independently F, $CF_3$, or $CF_2CF_3$, $CF_2H$, $CF_2CF_2H$, $CFHCF_3$, $CFHCF_2H$;

$R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring; and $R_9$ is F, $CF_3$, or $CF_2CF_3$.

Scheme 2: fluorinated ring monomers containing multiple rings

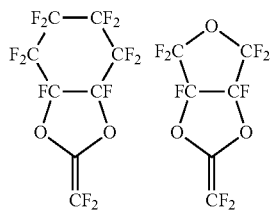

In another aspect, the fluorinated ring monomer can include one or more acyclic monomers that, upon polymerization, produce a fluorinated ring. For example, the fourth structure depicted in Scheme 1 can cyclize upon polymerization to produce a five-membered ring.

In one aspect, the fluorinated ring monomer can be a single compound in Schemes 1 or 2. In another aspect, the fluorinated ring monomer can be two or more different compounds in Schemes 1 or 2.

In another aspect, disclosed herein is an amorphous copolymer produced by polymerizing (a) one or more fluorinated ring monomers in the amount of from about 1 mol % to about 99.5 mol %, wherein the fluorinated ring monomer is at least a five-membered ring and (b) a comonomer in the amount of from about 0.5 mol % to about 99 mol %. In one aspect, the amount of fluorinated ring monomer used to produce the copolymers described herein is 1, 5, 10, 15, 20, 25, 30, 35, 40, 45, 50, 55, 60, 65, 70, 75, 80, 85, 90, 95, or about 99.5 mol %, or a combination of any of the foregoing values, or a range encompassing any of the foregoing values. In one aspect, the amount of fluorinated ring monomer used to produce the copolymers described herein is from about 80 mol % to about 99 mol %.

Crosslinkers

The crosslinkers provided herein are compounds that possess functional groups that permit crosslinking between two or more different copolymers. In one aspect, the crosslinker is an olefinic compound that when copolymerized with a fluorinated ring monomer produces an amorphous fluorinated copolymer. In one aspect, the amorphous fluorinated copolymer has a plurality of crosslinkable groups that are pendant to the copolymer backbone. In one aspect, the crosslinker comprises a perfluorinated olefinic compound comprising at least one crosslinkable group.

The nature of the crosslinkable group can vary depending upon the crosslinking conditions. In one aspect, the crosslinkable group comprises a photoactive group or a thermally active group. In one aspect, the crosslinkable group comprises an alkyl ester group, a cyano group, or a fluorinated vinyl ether group.

In one aspect, the crosslinker comprises one or more compounds having the structure I:

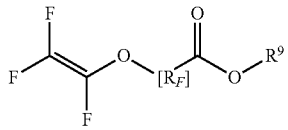

I wherein $R_F$ is a perfluoroalkyl group having from 1 to 6 carbon atoms with optionally 1 or 2 ether oxygen atoms, and
$R^9$ is a linear or branched alkyl group having from 1 to 6 carbon atoms.

In one aspect, $R^9$ in structure I is methyl or ethyl. In another aspect, $R^F$ in structure I is $(CF_2)_r$, where r is 1, 2, 3, or 4. In another aspect, $R^F$ in structure I is $(CF_2)_s$—O—$(CF_2)_t$, where s and t are 1, 2, 3, or 4.

In one aspect, the crosslinker comprises one or more compounds having the structure II:

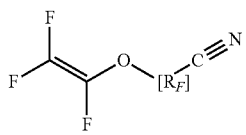

II wherein $R_F$ is a perfluoroalkyl group having from 1 to 6 carbon atoms with optionally 1 or 2 ether oxygen atoms.

In one aspect, $R^F$ in structure II is $(CF_2)_r$, where r is 1, 2, 3, or 4. In another aspect, $R^F$ in structure II is $(CF_2)_s$—O—$(CF_2)_t$, where s and t are 1, 2, 3, or 4.

In another aspect, the crosslinker comprises one or more compounds having the structure III:

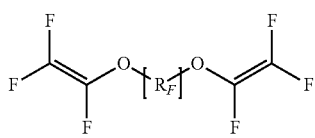

III wherein $R_F$ is a perfluoroalkyl group having from 1 to 6 carbon atoms with optionally 1 or 2 ether oxygen atoms.

In one aspect, $R^F$ in structure III is $(CF_2)_r$, where r is 1, 2, 3, or 4. In another aspect, $R^F$ in structure III is $(CF_2)_s$—O—$(CF_2)_t$, where s and t are 1, 2, 3, or 4.

In one aspect, the crosslinker is:

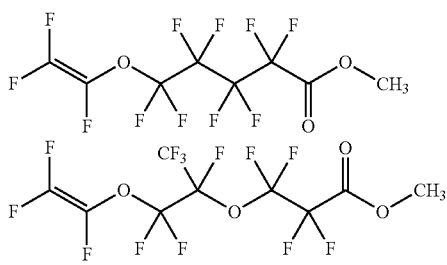

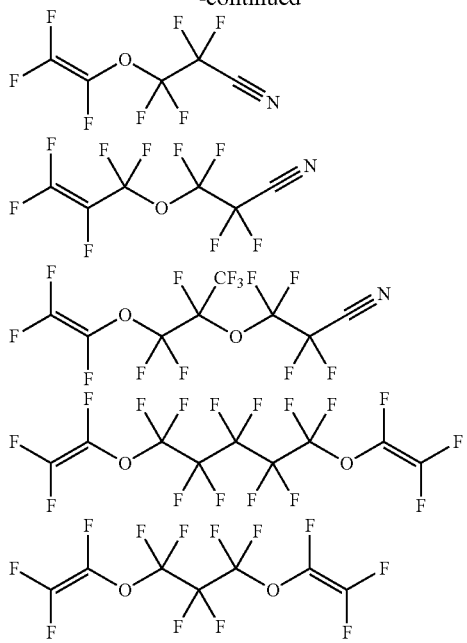

or any combination thereof.

The crosslinker can include one or more different compounds. In one aspect, the amount of crosslinker used to produce the amorphous fluorinated copolymers described herein is 1, 2, 3, 4, 5, 6, 7, 8, 9, 10, 11, 12, 13, 14, 15, 16, 17, 18, 19, or about 20 mol %, or a combination of any of the foregoing values, or a range encompassing any of the foregoing values. In one aspect, the amount of crosslinker used to produce the copolymers described herein is from about 1 mol % to about 10 mol %, or about 1 mol % to about 5 mol %.

Comonomers

In one aspect, the fluorinated ring monomer and the crosslinker are copolymerized with a third monomer, where the third comonomer is different from the fluorinated ring monomer and the crosslinker. In one aspect, the third monomer is a fluorinated vinyl compound or a fluorinated vinyl ether compound. In another aspect, the comonomer is a fluorinated compound with two or more ether oxygens. In one aspect, the third comonomer can be perfluorinated. In one aspect, the third comonomer is an olefinic compound having two or more ether oxygens. In another aspect, the third comonomer is an olefinic compound having two or more perfluoro ether groups (—$CF_2$—O—$CF_2$—).

In one aspect, the third comonomer includes one or more compounds having the following structure:

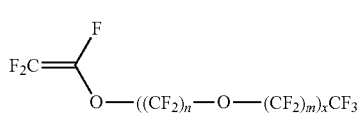

where n and m are independently 1, 2, or 3, and x is 1 or 2.

In a further aspect, the third comonomer can be a single compound, or can be two or more different compounds having the structure above.

In another aspect, representative third comonomers useful herein include, but are not limited to, those shown in Scheme 3 below, and any combination thereof:

Scheme 3: monomers containing multiple ether oxygens

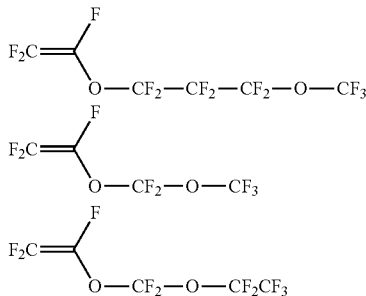

In one aspect, the amount of third comonomer used to produce the copolymers described herein can be from about 0.5, 1, 5, 10, 15, 20, 25, 30, 35, 40, 45, 50, 55, 60, 65, 70, 75, 80, 85, 90, 95, or about 99.5 mol %, or a combination of any of the foregoing values, or a range encompassing any of the foregoing values. In a further aspect, the amount of comonomer is from about 1 mol % to about 20 mol %.

Polymerization Method

In one aspect, the amorphous fluorinated copolymers described herein can be made by solution or aqueous emulsion polymerization. In another aspect, if the solution method is used, suitable solvents can be poly- or perfluorinated compounds such as perfluorooctane, hexafluoroisopropanol (HFIP), 1,1,1,3,3,3-hexafluoro-2-methoxypropane (HFMOP), Vertrel® XF ($CF_3CFHCFHCF_2CF_3$), or Fluorinert® FC-43 (perfluorotri-n-butyl amine). In an alternative aspect, if the aqueous emulsion method is used, a suitable surfactant will be used. In one aspect, the disclosed polymers can optionally be polymerized in the absence of any solvent. In a further aspect, initiators can be chosen from those typically used for fluoropolymers such as hydrocarbon peroxides, fluorocarbon peroxides, hydrocarbon peroxydicarbonates, and inorganic types such as persulfates.

In one aspect, depending on the relative reactivity of the monomers to be used in the polymerization, they can either be added as a single precharge, or they may need to be co-fed as a ratioed mixture to produce the desired copolymer composition.

In another aspect, when the polymerization is determined to be complete, the polymer can be isolated using methods known in the art. In one aspect, for the solution method, the solvent (and any unreacted monomer(s)) can be removed by distillation at atmospheric or lower pressure. In some aspects, due to the typically high viscosity and amorphous nature of the polymers of this disclosure, further rigorous drying is often required to get rid of residual solvent. In a further aspect, this can involve heating to between 200 to 300° C. at atmospheric or lower pressure for between 2 to 48 hours. In another aspect, tor the aqueous emulsion method, the emulsion can be broken by several methods including freeze/thaw, addition of a strong mineral acid such as nitric acid, high shear mixing, or a combination of these methods.

The Examples provide non-limiting procedures for producing the copolymers described herein.

Structural Features of Amorphous Fluorinated Copolymers

The amorphous fluorinated copolymers described herein include the first copolymer comprises a plurality of fluorinated ring units in the amount of 1 mol % to 99.5 mol %, and wherein the fluorinated ring unit is at least a five membered ring, and a plurality of crosslinker units. In one aspect, the fluorinated ring units can be present in an amount of about 1, 5, 10, 15, 20, 25, 30, 35, 40, 45, 50, 55, 60, 65, 70, 75, 80, 85, 90, 95, or about 99.5 mol %, or a combination of any of the foregoing values, or a range encompassing any of the foregoing values. In one aspect, the fluorinated ring unit is present in the amount of from about 80 mol % to about 99 mol %. In another aspect, the crosslinker unit can be present in an amount of about 1, 2, 3, 4, 5, 6, 7, 8, 9, 10, 11, 12, 13, 14, 15, 16, 17, 18, 19, or about 20 mol %, or a combination of any of the foregoing values, or a range encompassing any of the foregoing values. In one aspect, the amount of crosslinker used to produce the copolymers described herein is from about 1 mol % to about 10 mol %, or about 1 mol % to about 5 mol %.

In some aspects, the fluorinated ring unit can be perfluorinated. In another aspect, the fluorinated ring unit can include a five- or six-membered ring. In one aspect, the fluorinated ring unit can include one or more of the following structures:

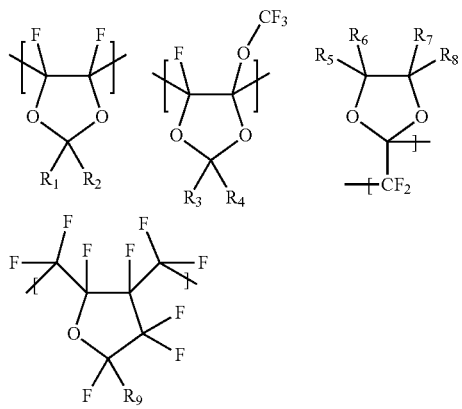

wherein:
$R_1$ and $R_2$ are independently F, $CF_3$, $CF_2CF_3$, $CF_2H$, $CF_2CF_2H$, $CFHCF_3$, $CFHCF_2H$;
$R_3$ and $R_4$ are independently F, $CF_3$, or $CF_2CF_3$, $CF_2H$, $CF_2CF_2H$, $CFHCF_3$, $CFHCF_2H$;
$R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring; and
$R_9$ is F, $CF_3$, or $CF_2CF_3$.

In another aspect, the fluorinated ring unit can be a single structural unit. In an alternative aspect, the fluorinated ring unit can be two or more different structural units. In one aspect, the fluorinated ring unit can be

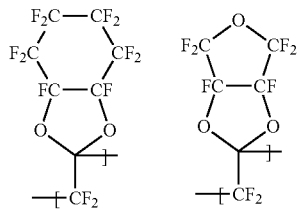

or any combination thereof.

In one aspect, the amorphous fluorinated copolymer has a plurality of crosslinker units with crosslinkable groups that are pendant to the copolymer backbone. In one aspect, the crosslinker comprises a perfluorinated olefinic compound comprising at least one crosslinkable group. In one aspect, the crosslinker unit has the structure IV, V, or VI, where $R^F$ and $R^9$ are as defined above with respect to structures I, II, and III:

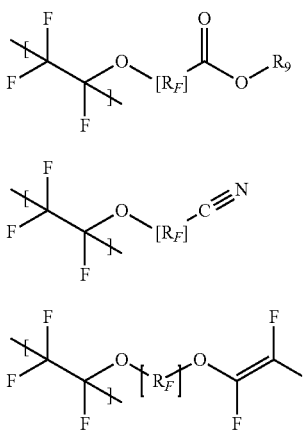

In another aspect, when a third comonomer is used to produce the amorphous fluorinated copolymer, a third comonomeric unit can be present. In one aspect, the third comonomeric unit can be perfluorinated. In one aspect, the third comonomeric unit includes one or more units having the following structure:

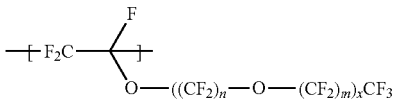

where n and m are independently 1, 2, or 3, and x is 1 or 2.

In one aspect, the third comonomeric unit can be a single structural unit. In another aspect, the third comonomeric unit can be two or more different structural units. In another aspect, the third comonomeric unit can be:

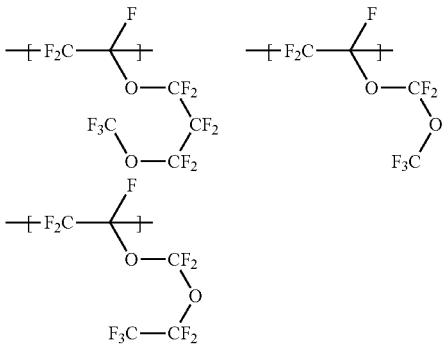

or any combination thereof.

Copolymer Properties and Composition of the Amorphous Fluorinated Copolymers

In one aspect, the composition of the amorphous fluorinated copolymers used herein can usually be determined by $^{19}$F NMR spectroscopy. Further in this aspect, the polymers are readily soluble in perfluorobenzene and an insert probe of deuterobenzene ($C_6D_6$) can be used to give a lock signal.

In a further aspect, differential scanning calorimetry (DSC) can be used to determine the glass transition temperature ($T_g$), and the molecular weight distribution can be found by using gel permeation chromatography (GPC) with a styrene-divinyl benzene column in a perfluorinated solvent coupled with a multi-detector analysis module including refractive index, low-angle light scattering, and right-angle light scattering detectors or using other suitable equipment and/or methods as known in the art. If desired, in one aspect, the type and concentration of end groups can also be determined by pressing a film of the polymer and acquiring an infrared (IR) spectrum in transmission mode.

In one aspect, the amorphous fluorinated copolymer can have a glass transition temperature of from about 0° C. to about 300° C., or about 25° C., 50° C., 75° C., 100° C., 125° C., 150° C., 175° C., 200° C., 225° C., 250° C., 275° C., or 300° C., or a combination of any of the foregoing values, or a range encompassing any of the foregoing values.

In still another aspect, the amorphous fluorinated copolymer can have a number average molecular weight ($M_n$) of from about 10 kDa to about 2,000 kDa, or 10 kDa, 50 kDa, 100 kDa, 150 kDa, 200 kDa, 250 kDa, 300 kDa, 350 kDa, 400 kDa, 450 kDa, 500 kDa, 550 kDa, 600 kDa, 650 kDa, 700 kDa, 750 kDa, 800 kDa, 850 kDa, 900 kDa, 950 kDa, 1,000 kDa, 1,050 kDa, 1,100 kDa, 1,150 kDa, 1,200 kDa, 1,250 kDa, 1,300 kDa, 1,350 kDa, 1,400 kDa, 1,450 kDa, 1,500 kDa, 1550 kDa, 1,600 kDa, 1,650 kDa, 1,700 kDa, 1,750 kDa, 1,800 kDa, 1,850 kDa, 1,900 kDa, 1,950 kDa, or 2,000 kDa, or a combination of any of the foregoing values, or a range encompassing any of the foregoing values.

In still another aspect, the amorphous fluorinated copolymer can have a weight average molecular weight ($M_w$) of from about 10,000 g/mol to about 3,000,000 g/mol, or 10,000 g/mol, 50,000 g/mol, 100,000 g/mol, 200,000 g/mol, 300,000 g/mol, 400,000 g/mol, 500,000 g/mol, 600,000 g/mol, 700,000 g/mol, 800,000 g/mol, 900,000 g/mol, 1,000,000 g/mol, 1,100,000 g/mol, 1,200,000 g/mol, 1,300,000 g/mol, 1,400,000 g/mol, 1,500,000 g/mol, 1,600,000 g/mol, 1,700,000 g/mol, 1,800,000 g/mol, 1,900,000 g/mol, 2,000,000 g/mol, 2,100,000 g/mol, 2,200,000 g/mol, 2,300,000 g/mol, 2,400,000 g/mol, 2,500,000 g/mol, 2,600,000 g/mol, 2,700,000 g/mol, 2,800,000 g/mol, 2,900,000 g/mol, or 3,000,000 g/mol, or a combination of any of the foregoing values, or a range encompassing any of the foregoing values.

Preparation of Amorphous Crosslinked Fluorinated Copolymers

The amorphous fluorinated copolymers described herein are crosslinked to produce amorphous crosslinked fluorinated copolymers. In one aspect, the amorphous fluorinated copolymer can be formed into a shaped component, and then the component is exposed to crosslinking conditions to produce the crosslinked copolymer. The component may be formed by using any of a number of techniques including, but not limited to, casting, extruding, molding, shaping. In another aspect, the component may be in the form of a sheet, film, membrane, or other useful forms.

Suitable crosslinking technique or conditions thereof may be determined, at least in part, based upon the selected crosslinking monomer and the desired results. In one aspect, the amorphous fluorinated copolymer is heated for a sufficient time and temperature to crosslink the copolymer. In one aspect, the amorphous fluorinated copolymer is crosslinked by heating the copolymer at a temperature greater than 300° C. In another aspect, the amorphous fluorinated copolymer is crosslinked by heating the copolymer at a temperature of from about 300° C. to about 350° C., or about 300° C., 305° C., 310° C., 315° C., 320° C., 325° C., 330°

C., 335° C., 340° C., 345° C., or 350° C., where any value can be a lower and upper endpoint of a range (e.g., 310° C. to 330° C.). In another aspect, the amorphous fluorinated copolymer is heated from 0.5 minutes to 60 minutes, or 0.5 minutes, 5 minutes, 10 minutes, 15 minutes, 20 minutes, 25 minutes, 30 minutes, 35 minutes, 40 minutes, 45 minutes, 50 minutes, 55 minutes, or 60 minutes, where any value can be a lower and upper endpoint of a range (e.g., 10 minutes to 30 minutes).

In another aspect, the amorphous fluorinated copolymer is crosslinked by exposing the copolymer to UV radiation. In one aspect, the amorphous fluorinated copolymer is exposed to UV radiation at a wavelength of less than 300 nm to crosslink the amorphous fluorinated copolymer. In another aspect, the amorphous fluorinated copolymer is exposed to UV radiation at a wavelength of about 250 nm to about 300 nm, or about 250 nm, 255 nm, 260 nm, 265 nm, 270 nm, 275 nm, 280 nm, 285 nm, 290 nm, or 300 nm, where any value can be a lower and upper endpoint of a range (e.g., 260 nm to 290 nm). In another aspect, the amorphous fluorinated copolymer is exposed to UV radiation from 0.5 hours to 48 hours, or 0.5 hours, 1 hour, 3 hours, 6 hours, 12 hours, 18 hours, 24 hours, 30 hours, 36 hours, or 48 hours, where any value can be a lower and upper endpoint of a range (e.g., 3 hours to 24 hours).

In certain aspects, the amorphous crosslinked fluorinated copolymer material has different thermal, mechanical, and/or solubility properties than the uncrosslinked copolymer. In some aspects, the crosslinked copolymer has improved cracking resistance as compared to similar uncrosslinked copolymers. In some aspects, the crosslinked copolymer material has a notched tensile strength that is greater than the notched tensile strength of the un-crosslinked amorphous copolymer. In an aspect, the crosslinked polymeric material has a notched tensile strength that is at least a factor of two greater than the notched tensile strength of the un-crosslinked amorphous copolymer.

Separation Articles and Applications Thereof

Disclosed herein are separation articles including or made from the amorphous crosslinked fluorinated copolymers described herein. In one aspect, the article can be a multi-layered structured article, wherein at least one layer of the structure includes or is made from the crosslinked copolymers described herein. In another aspect, the article can be a film, a membrane, a tube, or a fiber.

In still another aspect, the article can include a layer or coating of the amorphous crosslinked fluorinated copolymer. In one aspect, the layer or coating has a thickness of less than or equal to 1 µm, or less than or equal to about 950, 900, 850, 800, 750, 700, 650, 600, 550, or about 500 nm, or a combination of any of the foregoing values, or a range encompassing any of the foregoing values. In another aspect, the layer or coating has a thickness of about 50 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, or 1 µm, or a combination of any of the foregoing values, or a range encompassing any of the foregoing values.

In a further aspect, the amorphous crosslinked fluorinated copolymer may be formed or shaped into any shape that is necessary or desirable for use as a separation article. There are numerous methods known to shape the copolymer chosen for the selective layer into single-layer or multi-layer films or membranes. In some aspects, the selective layer can comprise an unsupported film, tube, or fiber of the amorphous crosslinked fluorinated copolymer as a single-layer membrane. In some aspects, an unsupported film may be too thick to permit desirable gas flow through the membrane. Therefore, in some aspects, the membrane may comprise a very thin selective layer composed of the amorphous crosslinked fluorinated copolymer placed on top of (i.e., adjacent to or in contact with) a much more permeable supporting structure. For example, in one aspect, the membrane may comprise an integral asymmetric membrane, in which a more dense selective layer is placed on top of a microporous support layer. Such membranes were originally developed by Loeb and Sourirajan, and their preparation in flat sheet or hollow fiber form is described, for example, in U.S. Pat. No. 3,133,132 to Loeb, and U.S. Pat. No. 4,230,463 to Henis and Tripodi, the disclosures of which are incorporated herein by reference.

In some aspects, the membrane may comprise multiple layers, including at least one selective layer, with each layer serving a distinct purpose. Further in this aspect, in such multilayer composite membranes, there may be a microporous support layer, which provides mechanical strength. In another aspect, the multilayer membrane may include a non-porous, but highly permeable "gutter" layer, for example, coated on the microporous support layer. Further in this aspect, this gutter layer is generally not selective, but may instead form a smooth surface on which to deposit the extremely thin selective layer, which performs the primary selective function of the membrane. In another aspect, the gutter layer also may channel permeate gas to the pores of the support layer. In an additional aspect, the selective layer may be covered by a protective layer. In one aspect, the primary purpose of the protective layer is to prevent fouling of the selective layer, such as by certain components of the gas stream. In some aspects, the disclosed multilayer structures may be, but not necessarily, formed by solution casting. General preparation techniques for making composite membranes of this type are described, for example, in U.S. Pat. No. 4,243,701 to Riley et al, the disclosures of which are incorporated herein by reference. In one aspect, disclosed herein is a gas separation membrane including a feed side and a permeate side, wherein the separation membrane has a selective layer that includes or is constructed from a copolymer described herein.

In one aspect, the multilayer composite membrane may take flat-sheet, tube, or hollow-fiber form. In hollow-fiber form, in one aspect, multilayer composite membranes may be made by a coating procedure as taught, for example, in U.S. Pat. Nos. 4,863,761; 5,242,636; and 5,156,888, or by using a double-capillary spinneret of the type taught in U.S. Pat. Nos. 5,141,642 and 5,318,417, the disclosures of which are incorporated herein by reference.

In another aspect, the thickness of the membrane's selective layer may be determined based on one or more parameters of the separation process. In some aspects, the thickness of the membrane's selective layer is less than about 1 µm. In a preferred embodiment, the selective layer can be even thinner, for example, the selective layer can be as thin as 0.5 µm or less. The selective layer, in one aspect, should have a thickness that is sufficiently thin so that the membrane provide a pressure-normalized hydrogen flux, as measured with pure hydrogen gas at 25° C., of at least 100 GPU (where 1 GPU=1×10$^{-6}$ cm$^3$(STP)/cm$^2$s cmHg), and preferably at least 400 GPU.

In one aspect, the separation articles described herein are mechanically robust and also exhibit high thermal stability, and high chemical resistance. In another aspect, the copolymers described herein that form the selective layer are typically soluble only in perfluorinated solvents, and after crosslinking, are typically insoluble even in perfluorinated solvents. In still another aspect, they are also typically stable over many years when immersed in acids, alkalis, oils, low-molecular-weight esters, ethers and ketones, aliphatic and aromatic hydrocarbons, and oxidizing agents. In yet another aspect, they are also thermally stable over many years at temperatures below the glass transition temperature. Thus, in any of these aspects, they are suitable for use in natural gas streams and many other demanding environments.

In one aspect, the separation article may be used in any suitable apparatus. For example, membranes are typically used in the form of a module, comprising the membrane prepared in any known form, and housed in any convenient type of housing and separation unit. Any number of membrane modules may be used in conjunction (e.g., in serial, in parallel) to treat a gas stream. The number of membrane modules may be determined based on one or more factors including, for example, the necessary or desired flow volume, stream composition, and other operating parameters of the separation process. In the separation process, in one aspect, the membrane is exposed to a flowing gaseous feed-composition comprising the gas mixture. In another aspect, this gas flow is created by a pressure differential that is established across the membrane, either through pressurization of the feed/retentate side of the membrane, or application of vacuum to the permeate side of the membrane. Separation of the components of the gas stream occurs, in one aspect, through the membrane, producing a gas stream on the permeate-side of the membrane with a composition enriched in the more permeable component of the gas mixture. Conversely, in another aspect, the gas stream exiting the module on the feed/retentate side of the membrane has a composition that is depleted in the more permeable component of the gas mixture, and thus enriched in the less permeable component (or components) of the gas mixture.

In one aspect, the disclosure relates to an apparatus and a process for separating at least one component from a gas mixture. In another aspect, the disclosed apparatus includes a separation article as described herein (e.g., membrane) that includes a "selective layer" that is configured to be selectively permeable for the desired component to be separated from the gas mixture. Optionally, in an aspect, the membrane may contain one or more other layers which serve various purposes, such as a porous support layer, a "gutter layer" which allows the permeate gas to pass from the selective layer to the porous layer with minimal flow impedance, and a protective layer, which protects the selective layer from fouling.

The separation articles described herein are useful in the field of gas separation. In one aspect, disclosed herein is a method for separating a first gaseous component from a gaseous mixture, the process comprising passing the gaseous mixture across a separation article described herein. In one aspect, the separation article is a membrane having a selective layer composed of an amorphous crosslinked fluorinated copolymer described herein. In some aspects, the amorphous crosslinked fluorinated copolymer can be cast from solution onto a membrane to produce a selective layer. In one aspect, amorphous crosslinked fluorinated copolymer is soluble in one or more solvents. Conversely, crystalline fluoropolymers, which typically have negligible solubility in solvents, are not be preferred. In another aspect, crystalline polymers typically exhibit low gas permeabilities as compared to amorphous polymers.

In some aspects, a process for separating a first component from a gaseous mixture includes introducing a feed stream comprising the gaseous mixture to the disclosed membrane. Further in these aspects, the membrane has a first side, a second side, and a selective layer that is selectively permeable for the first component, i.e., the first component has a higher permeability through the selective layer than other components of the gaseous mixture. In one aspect, the feed stream is introduced to the first side of the membrane. Further in this aspect, a driving force (e.g., pressure differential) causes at least a portion of the gaseous mixture to permeate through the membrane from the first side to the second side, providing a permeate stream on the second side of the membrane. In a further aspect, the resulting permeate stream is enriched in the first component. In another aspect, a residue or retentate stream depleted in the first component may be withdrawn from the first side of the membrane.

In one aspect, in the gas separation method disclosed herein, the method includes at least the following steps:
(a) passing the gaseous mixture across a separation article having a feed side and a permeate side, the separation article having a selective layer that is selectively permeable to at least the first gaseous component, said selective layer comprising the amorphous crosslinked fluorinated copolymer; and
(b) providing a driving force sufficient for transmembrane permeation of at least a portion of the gaseous mixture from the feed side to the permeate side of the separation membrane, resulting in a gaseous permeate stream on the permeate side of the separation membrane and a gaseous retentate stream on the feed side of the separation membrane, wherein the gaseous permeate stream includes the first gaseous component.

In another aspect, the permeate stream has a concentration of first component that is greater than a concentration of the first component in the retentate stream.

In still another aspect, the method further includes the step of withdrawing the permeate stream from the permeate side of the separation article. In a further aspect, the method also includes the step of withdrawing the retentate stream from the feed side of the separation membrane.

In one aspect, the first gaseous component is carbon dioxide, hydrogen sulfide, helium, or any combination thereof. In one aspect, the gaseous mixture includes methane and carbon dioxide.

In another aspect, the gaseous mixture includes one or more fluorinated refrigerant gases. In another aspect, the gas mixture includes an azeotropic or near-azeotropic mixture of gases. IN another aspect, the gas mixture includes an azeotropic or near-azeotropic mixture of gases, of which one or more of the components is a fluorinated refrigerant.

In another aspect, more than about 50, 55, 60, 65, 70, 76, 80, 86, 90, or more than about 95% of the first gaseous component in the gaseous mixture permeates through the separation membrane, or a combination of any of the foregoing values, or a range encompassing any of the foregoing values.

In one aspect, the separation articles described herein will be useful in a number of applications, particularly those related to separation of $CO_2$ from other gases. In one aspect, the disclosed amorphous crosslinked fluorinated copolymer including fluorinated comonomers containing multiple ether oxygens show even greater enhancement of the solubility of $CO_2$ in amorphous fluoropolymers, and hence improve the selectivity of these materials with regard to certain separations of $CO_2$ gas.

In one aspect, the separation articles described herein are useful for separating acid gases, including carbon dioxide and hydrogen sulfide, from a natural gas stream, which might be found either at a well or a processing plant. In another aspect, since such natural gas streams often contain higher molecular weight hydrocarbon vapors that can foul or plasticize hydrocarbon membranes, the perfluorinated nature of the selective layer in the present disclosure is particularly suitable for such applications, as it is highly resistant to such degradation.

In addition to undesirable acid gases, in one aspect, natural gas streams sometimes contain helium, which is desirable as a separate product. In a further aspect, the process of the present disclosure is useful for separating helium from natural as streams, so that the resulting helium-rich gas can be further refined into purified helium.

In one aspect, the process of the present disclosure is useful for separating mixtures of fluorinated refrigerant gases, including azeotropic or near azeotropic mixtures of such gases.

Aspects

Aspect 1. A separation article comprising a first surface and a second surface and a layer comprising an amorphous crosslinked fluorinated copolymer adjacent to at least one of the first surface or the second surface.

Aspect 2. The separation article of Aspect 1, wherein the amorphous crosslinked fluorinated copolymer is produced by (a) copolymerizing one or more fluorinated ring monomers in the amount of 1 mol % to 99.5 mol %, wherein the fluorinated ring monomer is at least a five membered ring, and a crosslinker in the amount of from 0.2 mol % to 40 mol % to produce a first copolymer and (b) crosslinking the first copolymer to produce the amorphous crosslinked fluoropolymer.

Aspect 3. The separation article of Aspect 2, wherein the fluorinated ring monomer is perfluorinated.

Aspect 4. The separation article of Aspect 2, wherein the fluorinated ring monomer is an olefinic compound.

Aspect 5. The separation article of Aspect 2, wherein the fluorinated ring monomer comprises a five or six membered ring.

Aspect 6. The separation article of Aspect 2, wherein the fluorinated ring monomer is produced by the cyclopolymerization of a linear monomer that has an olefin on one end of the monomer and a vinyl ether on the other end of the monomer.

Aspect 7. The separation article of Aspect 2, wherein the fluorinated ring monomer comprises one or more of the following compounds:

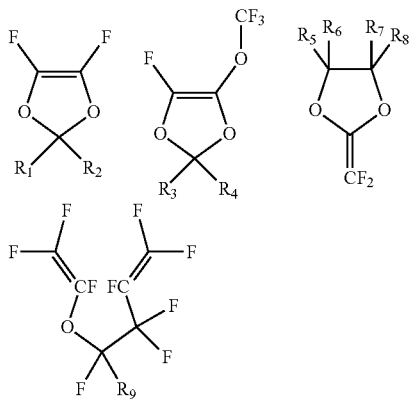

wherein
$R_1$ and $R_2$ are independently F, $CF_3$, $CF_2CF_3$, $CF_2H$, $CF_2CF_2H$, $CFHCF_3$, $CFHCF_2H$;
$R_3$ and $R_4$ are independently F, $CF_3$, or $CF_2CF_3$, $CF_2H$, $CF_2CF_2H$, $CFHCF_3$, $CFHCF_2H$;
$R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring; and
$R_9$ is F, $CF_3$, or $CF_2CF_3$.

Aspect 8. The separation article in any one of Aspects 2-7, wherein the fluorinated ring monomer is a single compound.

Aspect 9. The separation article in any one of Aspects 2-7, wherein the fluorinated ring monomer is two or more different compounds.

Aspect 10. The separation article of Aspect 2, wherein the fluorinated ring monomer is:

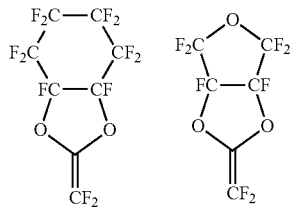

or a combination thereof.

Aspect 11. The separation article in any one of Aspects 2-10, wherein the fluorinated ring monomer is in the amount of 80 mol % to 99 mol %.

Aspect 12. The separation article in any one of Aspects 2-11, wherein the crosslinker comprises a perfluorinated olefinic compound comprising at least one crosslinkable group.

Aspect 13. The separation article of Aspect 12, wherein the crosslinkable group comprises a photoactive group or a thermally active group.

Aspect 14. The separation article of Aspect 12, wherein the crosslinkable group comprises an alkyl ester group, a cyano group, or a fluorinated vinyl ether group.

Aspect 15. The separation article in any one of Aspects 2-11, wherein the crosslinker comprises one or more compounds having the structure I:

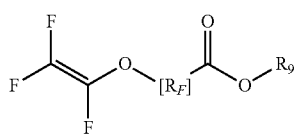

wherein $R_F$ is a perfluoroalkyl group having from 1 to 6 carbon atoms with optionally 1 or 2 ether oxygen atoms, and $R^9$ is a linear or branched alkyl group having from 1 to 6 carbon atoms.

Aspect 16. The separation article in any one of Aspects 2-11, wherein the crosslinker comprises one or more compounds having the structure II:

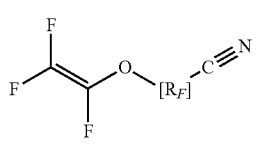

wherein $R_F$ is a perfluoroalkyl group having from 1 to 6 carbon atoms with optionally 1 or 2 ether oxygen atoms.

Aspect 17. The separation article in any one of Aspects 2-11, wherein the crosslinker comprises one or more compounds having the structure III:

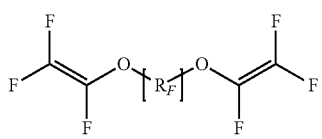

III wherein $R_F$ is a perfluoroalkyl group having from 1 to 6 carbon atoms with optionally 1 or 2 ether oxygen atoms.

Aspect 18. The separation article in any one of Aspects 2-11, wherein the crosslinker is a single compound.

Aspect 19. The separation article in any one of Aspects 2-11, wherein the crosslinker is two or more different compounds.

Aspect 20. The separation article in any one of Aspects 2-11, wherein the crosslinker is:

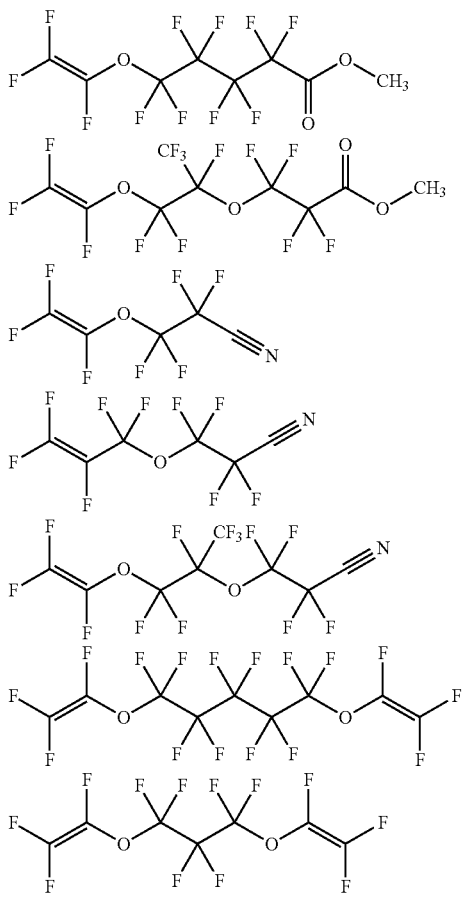

or any combination thereof.

Aspect 21. The separation article in any one of Aspects 2-20, wherein the crosslinker is in the amount of 0.2 mol % to 20 mol %.

Aspect 22. The separation article in any one of Aspects 2-21, wherein the fluorinated ring monomer comprises one or more of the following compounds:

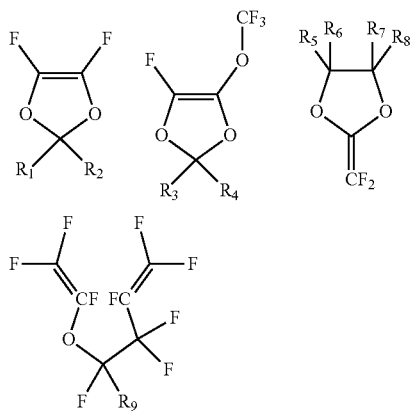

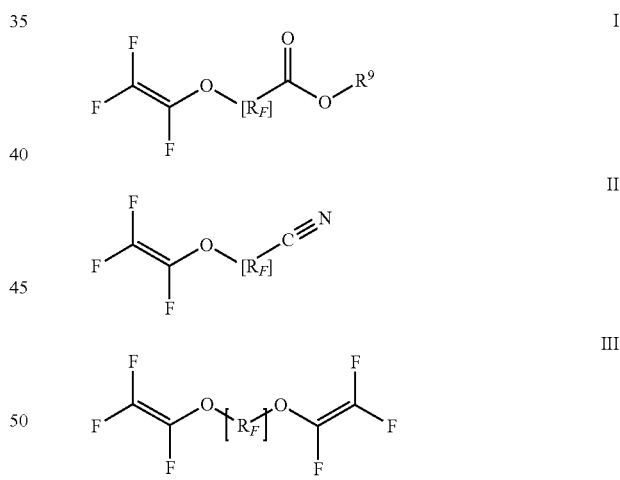

wherein $R_1$ and $R_2$ are independently F, $CF_3$, $CF_2CF_3$, $CF_2H$, $CF_2CF_2H$, $CFHCF_3$, $CFHCF_2H$;

$R_3$ and $R_4$ are independently F, $CF_3$, or $CF_2CF_3$, $CF_2H$, $CF_2CF_2H$, $CFHCF_3$, $CFHCF_2H$;

$R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring; and $R_9$ is F, $CF_3$, or $CF_2CF_3$; and the crosslinker comprises one or more compounds having the following structure:

I

II

III wherein $R_F$ is a perfluoroalkyl group having from 1 to 6 carbon atoms with optionally 1 or 2 ether oxygen atoms, and $R^9$ is a linear or branched alkyl group having from 1 to 6 carbon atoms.

Aspect 23. The separation article in any one of Aspects 2-22, wherein the fluorinated ring monomer and the crosslinker are copolymerized with a third monomer comprising a fluorinated vinyl compound or a fluorinated vinyl ether compound.

Aspect 24. The separation article of Aspect 23, wherein the third monomer has the structure IV:

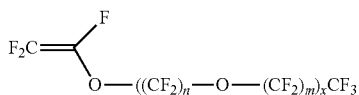

wherein n and m are independently 1, 2, or 3, and x is 1 or 2.

Aspect 25. The separation article of Aspect 23, wherein the third monomer is

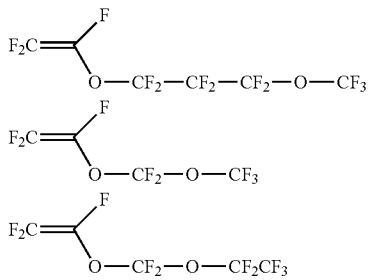

Aspect 26. The separation article in any one of Aspects 2-25, wherein the first copolymer is produced by solution or aqueous emulsion polymerization.

Aspect 27. The separation article in any one of Aspects 2-26, wherein the copolymerization is conducted in the presence of an initiator.

Aspect 28. The separation article of Aspect 27, wherein the initiator comprises a hydrocarbon peroxide, a fluorocarbon peroxide, a hydrocarbon peroxydicarbonate, an inorganic fluorocarbon initiator, or any combination thereof.

Aspect 29. The separation article in any one of Aspects 2-28, wherein the first copolymer is crosslinked by exposing the first copolymer to UV radiation at a wavelength of less than 300 nm.

Aspect 30. The separation article in any one of Aspects 2-28, wherein the first copolymer is crosslinked by exposing the first copolymer to UV radiation at a wavelength of less than 300 nm from about 0.5 hours to about 48 hours.

Aspect 31. The separation article in any one of Aspects 2-28, wherein the first copolymer is crosslinked by exposing the first copolymer to UV radiation at a wavelength of about 250 nm to about 300 nm from about 0.5 hours to about 48 hours.

Aspect 32. The separation article in any one of Aspects 2-28, wherein the first copolymer is crosslinked by heating the first copolymer at a temperature of from about 300° C. to about 350° C. for 0.5 minutes to 60 minutes.

Aspect 33. The separation article of Aspect 1, wherein the amorphous crosslinked fluorinated copolymer comprises a plurality of first copolymers and a plurality of crosslinker units covalently bonded to the first polymers, wherein the first copolymer comprises a plurality of fluorinated ring units in the amount of 1 mol % to 99.5 mol %, and wherein the fluorinated ring unit is at least a five membered ring.

Aspect 34. The separation article of Aspect 33, wherein the fluorinated ring unit is perfluorinated.

Aspect 35. The separation article of Aspect 33, wherein the fluorinated ring unit comprises a five or six membered ring.

Aspect 36. The separation article of Aspect 33, wherein the fluorinated ring unit comprises one or more of the following structures:

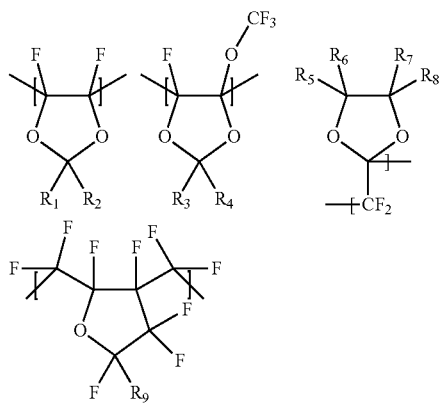

wherein
$R_1$ and $R_2$ are independently F, $CF_3$, $CF_2CF_3$, $CF_2H$, $CF_2CF_2H$, $CFHCF_3$, $CFHCF_2H$;
$R_3$ and $R_4$ are independently F, $CF_3$, or $CF_2CF_3$, $CF_2H$, $CF_2CF_2H$, $CFHCF_3$, $CFHCF_2H$;
$R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring; and
$R_9$ is F, $CF_3$, or $CF_2CF_3$.

Aspect 37. The separation article of Aspect 36, wherein the fluorinated ring unit is a single structural unit.

Aspect 38. The separation article of Aspect 36, wherein the fluorinated ring unit is two or more different structural units.

Aspect 39. The separation article of Aspect 36, wherein the fluorinated ring unit is:

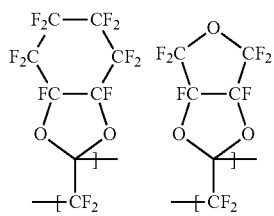

or a combination thereof.

Aspect 40. The separation article in any one of Aspects 33-39, wherein the fluorinated ring unit in the amount of 80 mol % to 99 mol %.

Aspect 41. The separation article in any one of Aspects 33-40, wherein the first copolymer further comprises a perfluorinated comonomeric unit that is not the fluorinated ring unit or crosslinker unit.

Aspect 42. The separation article of Aspect 41, wherein the comonomeric unit comprises one or more units having the following structure:

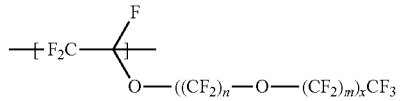

wherein n and m are independently 1, 2, or 3, and x is 1 or 2.

Aspect 43. The separation article of Aspect 41, wherein the comonomeric unit is a single structural unit.

Aspect 44. The separation article of Aspect 41, wherein the comonomeric unit is two or more different structural units.

Aspect 45. The separation article of Aspect 41, wherein the comonomeric unit is:

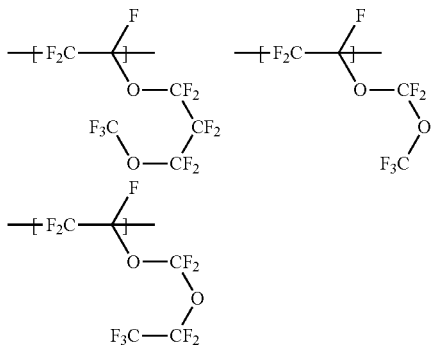

or any combination thereof.

Aspect 46. The separation article of Aspect 41, wherein the comonomeric unit is in the amount of 1 mol % to 20 mol %.

Aspect 47. The separation article in any one of Aspects 1-46, wherein the first copolymer has a glass transition temperature of from 0° C. to 300° C.

Aspect 48. The separation article in any one of Aspects 1-46, wherein the first copolymer has a $M_n$ of from 10 kDa to 2,000 kDa.

Aspect 49. The separation article in any one of Aspects 1-46, wherein the first copolymer has a $M_w$ of from 10,000 g/mol to 3,000,000 g/mol.

Aspect 50. The separation article in any one of Aspects 1-46, wherein the separation article comprises a multi-layer structured article, wherein at least one layer of the structure comprises the copolymer.

Aspect 51. The separation article in any one of Aspects 1-46, wherein the article comprises a film, membrane, tube, or fiber.

Aspect 52. The separation article in any one of Aspects 1-46, wherein the separation article comprises a layer of the amorphous crosslinked fluorinated copolymer, wherein the layer has a thickness of less than or equal to 1 μm.

Aspect 53. A method for separating a first gaseous component from a gaseous mixture said process comprising passing the gaseous mixture across a separation article in any one of Aspects 1-46.

Aspect 54. The method of Aspect 53, wherein the method comprises
(a) passing the gaseous mixture across a separation article having a feed side and a permeate side, the separation article having a selective layer that is selectively permeable to at least the first gaseous component, said selective layer comprising the amorphous crosslinked fluorinated copolymer;
(b) providing a driving force sufficient to provide for permeation of at least a portion of the gaseous mixture from the feed side to the permeate side of the separation article, resulting in a gaseous permeate stream on the permeate side of the separation article and a gaseous retentate stream on the feed side of the separation article, wherein the gaseous permeate stream comprises the first gaseous component.

Aspect 55. The method of Aspect 54, wherein the permeate stream has a concentration of first component that is greater than a concentration of the first component in the retentate stream.

Aspect 56. The method of Aspect 54 or 55, further comprising withdrawing the permeate stream from the permeate side of the separation article.

Aspect 57. The method in any one of Aspects 54-56, further comprising withdrawing the retentate stream from the feed side of the separation article.

Aspect 58. The method in any one of Aspects 54-57, wherein the first gaseous component is carbon dioxide, hydrogen sulfide, helium, or any combination thereof.

Aspect 59. The method in any one of Aspects 54-57, wherein the gaseous mixture comprises methane and carbon dioxide.

Aspect 60. The method in any one of Aspects 54-59, wherein more than about 50% or more of the first gaseous component in the gaseous mixture permeates through the separation article.

Aspect 61. An amorphous crosslinked fluorinated copolymer produced by the process comprising (a) copolymerizing one or more fluorinated ring monomers in the amount of 1 mol % to 99.5 mol %, wherein the fluorinated ring monomer is at least a five membered ring, and a crosslinker in the amount of from 0.2 mol % to 40 mol % to produce a first copolymer and (b) crosslinking the first copolymer to produce the amorphous crosslinked fluoropolymer.

Aspect 62. The copolymer of Aspect 61, wherein the fluorinated ring monomer is

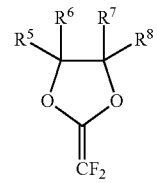

wherein $R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring.

Aspect 63. The copolymer of Aspect 62, wherein the crosslinker comprises a perfluorinated olefinic compound comprising at least one crosslinkable group.

Aspect 64. The copolymer of Aspect 63, wherein the crosslinkable group comprises a photoactive group or a thermally active group.

Aspect 65. The copolymer of Aspect 63, wherein the crosslinkable group comprises an alkyl ester group, a cyano group, or a fluorinated vinyl ether group.

Aspect 66. The copolymer of Aspect 62, wherein the crosslinker comprises one or more compounds having the structure I:

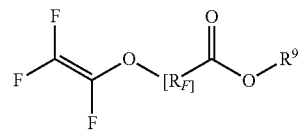

wherein $R_F$ is a perfluoroalkyl group having from 1 to 6 carbon atoms with optionally 1 or 2 ether oxygen atoms, and $R^9$ is a linear or branched alkyl group having from 1 to 6 carbon atoms.

Aspect 67. The copolymer of Aspect 61, wherein the crosslinker comprises one or more compounds having the structure II:

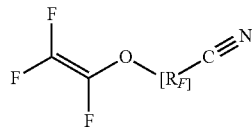

II wherein $R_F$ is a perfluoroalkyl group having from 1 to 6 carbon atoms with optionally 1 or 2 ether oxygen atoms.

Aspect 68. The copolymer of Aspect 61, wherein the crosslinker comprises one or more compounds having the structure III:

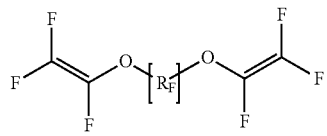

III wherein $R_F$ is a perfluoroalkyl group having from 1 to 6 carbon atoms with optionally 1 or 2 ether oxygen atoms.

Aspect 69. The copolymer of Aspect 61, wherein the crosslinker is:

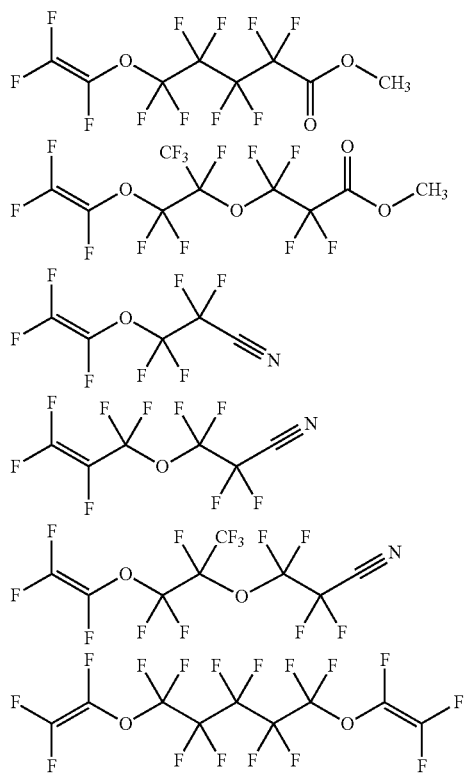

-continued

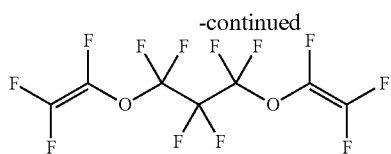

or any combination thereof.

Aspect 70. The copolymer of Aspect 61, wherein the fluorinated ring monomer and the crosslinker are copolymerized with a third monomer comprising a fluorinated vinyl compound or a fluorinated vinyl ether compound.

Aspect 71. The copolymer of Aspect 70, wherein the third monomer has the structure IV:

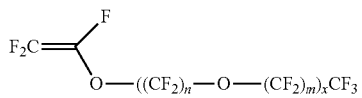

wherein n and m are independently 1, 2, or 3, and x is 1 or 2.

Aspect 72. The copolymer of Aspect 70, wherein the third monomer is

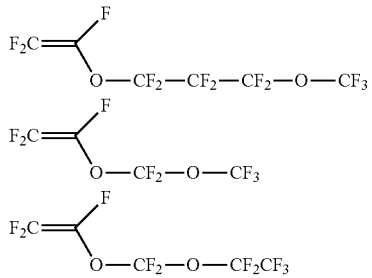

Aspect 73. The copolymer of Aspect 61, wherein the first copolymer is produced by solution or aqueous emulsion polymerization.

Aspect 74. An amorphous crosslinked fluorinated copolymer comprising a plurality of first copolymers and a plurality of crosslinker units covalently bonded to the first polymers, wherein the first copolymer comprises a plurality of fluorinated ring units in the amount of 1 mol % to 99.5 mol %, and wherein the fluorinated ring unit is at least a five membered ring.

Aspect 75. The copolymer of Aspect 74, wherein the fluorinated ring unit comprises the following structures:

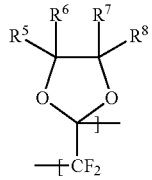

wherein $R_5$, $R_6$, $R_7$, and $R_8$ are independently F, $CF_3$, or $CF_2CF_3$, $CF_2H$, $CF_2CF_2H$, $CFHCF_3$, $CFHCF_2H$ and $R_6$ and $R_7$ can be contained within a 5- or 6-membered ring.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Test Methods

The polymeric materials, membranes and selective layers disclosed herein may be characterized using one or more of the following methods.

Glass Transition Temperature

The glass transition temperature of the polymeric materials may be evaluated using Differential scanning calorimetry (DSC), for example according to ASTM E1356-08 (2014), modified as necessary or desired for the disclosed materials and devices.

Notch Tensile Test

The polymeric materials may be evaluated according to ASTM F1473-18 (modified as necessary or desired for the disclosed materials and devices) to determine the notch tensile characteristics of the polymeric material.

Fracture Toughness

The polymeric materials may be evaluated according to ASTM E1820-20 (modified as necessary or desired for the disclosed materials and devices) to determine Fracture Toughness.

Determining J-R Curves

The polymeric materials may be evaluated according to ASTM D6068-10(2018) (modified as necessary or desired for the disclosed materials and devices) to characterize the crack growth resistance of the polymeric material.

Bent-Beam Method

The polymeric materials may be evaluated according to ASTM D3929-03(2015) (modified as necessary or desired for the disclosed materials and devices), to characterize the stress cracking properties of the polymeric material.

Example 1: Synthesis of PBVE-co-EVE-Me Copolymer

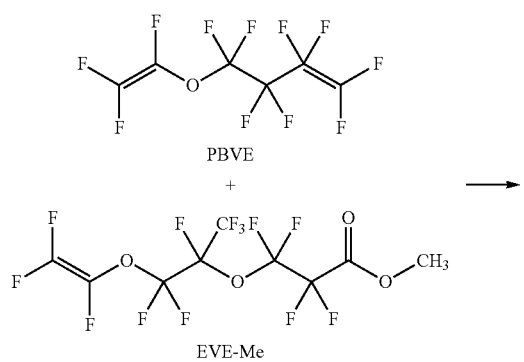

-continued

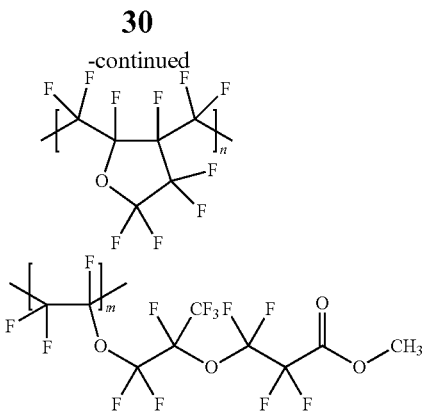

To a 1 L stainless steel reactor was added a magnetic stir bar and perfluorooctane (300 mL) solvent. The lid was attached and valves to an argon source and vacuum (30 Torr) were connected. The solvent was degassed by cycling four times through vacuum/argon backfill. PBVE ($CF_2$=CF—O—$CF_2CF_2$CF=$CF_2$, 50 mL, 80 g) was next added via syringe with a 12-inch stainless steel needle, along with EVE-Me ($CF_2$=CF—O—$CF_2$—CF($CF_3$)—O—$CF_2CF_2CO_2$Me, 3.1 mL, 5.0 g). The reactor was placed in an oil bath set to 60° C. and initiated using hexafluoropropylene oxide dimer peroxide (HFPO-DP, $CF_3CF_2CF_2$OCF($CF_3$)COO]$_2$) solution (0.16 M in Vertrel XF. 0.5 mL precharge, 1.5 mL added over 8 hrs. by syringe pump). After 24 hours the solution was transferred to a 500 mL round bottom flask and reduced in vacuo at 50° C. and 30 Torr to afford 15 g of soft colorless polymer that was still wet with solvent. Several grams of this wet material were further dried in open air in an aluminum pan at 280° C. for 24 h. This dry material was submitted for $T_g$ determination by DSC, molecular weight by GPC, and comonomer ratio by $^{19}$F NMR spectroscopy.

Results:

$T_g$=93° C. (PBVE homopolymer=108° C.). Material was amorphous due to lack of observable melting endotherm.

$M_n$=468,000 g/mol, $M_w$=508,000 g/mol

% EVE-Me by $^{19}$F NMR=2.7 mol %

IR (transmission mode): —$CH_3$ ν=2968 cm$^{-1}$, ester C=O ν=1792 cm$^{-1}$

Example 2: Synthesis of PBVE-co-PFBVOP Copolymer

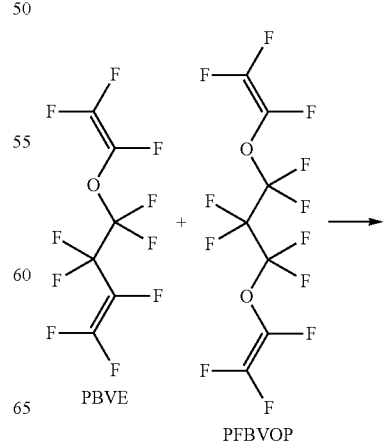

-continued

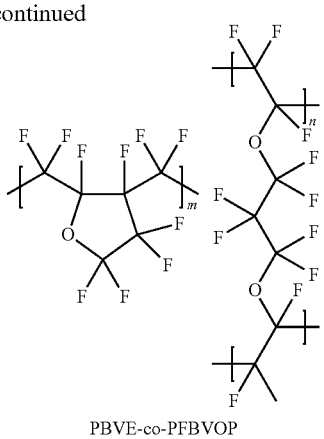

PBVE-co-PFBVOP

A 30 mL glass vial was loaded with a magnetic stirbar, PBVE (10.0 mL, 16.0 g), and PFBVOP (CF$_2$=CF—O—CF$_2$CF$_2$CF$_2$—O—CF=CF$_2$, 3.0 mL, 4.9 g). No added solvent was used for this polymerization. Argon gas was bubbled through the monomer mixture for 3 minutes to remove any oxygen. Next, perfluorobenzoyl peroxide initiator (40 mg, made as detailed in Oldham, P. H.; Williams, G. H. *J. Chem. Soc.* (C), 1970, 1260) was added. The cap was tightened and the vial was placed in an oil bath and stirred magnetically at 80° C. for 24 h. The result was a 20 g cylinder of a clear and rigid amorphous fluoropolymer glass. The polymer that was formed by reaction between the two monomers may then be further crosslinked to create a 3D network.

Example 3: Synthesis of PDD-co-EVE-Me Copolymer

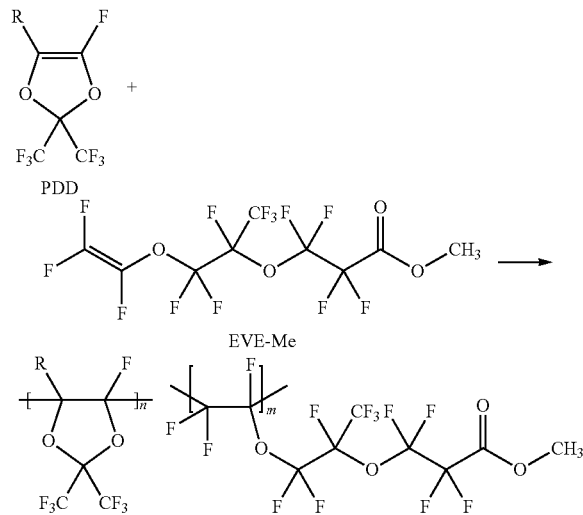

Perfluorooctane solvent (250 mL, 445 g) was added to a 500 mL Duran glass jar along with a magnetic stirbar. The lid was attached and valves to an argon source and vacuum (30 Torr) were connected. The solvent was degassed by cycling four times through vacuum/argon backfill. Freshly distilled PDD (30.0 mL, 51.6 g) was added via syringe, followed by the EVE-Me comonomer (3.2 mL, 5.0 g). The polymerization was initiated by addition of hexafluoropropylene oxide dimer peroxide (HFPO-DP, [CF$_3$CF$_2$CF$_2$OCF(CF$_3$)COO]$_2$) solution (2.0 mL of 0.16 M in Vertrel XF). The solution was stirred at 22° C. for 6 hours at which time it had completely gelled. The gel was dried in a vacuum oven (275° C., 200 milliTorr) for 15 hours to obtain 40.2 g of white copolymer. Evidence of incorporation of the EVE-Me monomer was determined by IR (transmission mode): —CH$_3$ v=2964 cm$^{-1}$, ester C=O v=1789 cm$^{-1}$.

Example 4: Fabrication of Composite Membrane with PBVE-co-EVE-Me Copolymer

A high-permeability amorphous fluoropolymer gutter layer was spin coated onto a porous support layer. After drying to remove substantially all of the solvent from the gutter layer polymer, a selective layer consisting of the above PBVE-co-EVE-Me copolymer was spin coated on top of the gutter layer. This layer was then dried to remove substantially all of the solvent from the composite membrane. Finally, the copolymer was cross-linked by use of ultraviolet illumination and/or elevated temperature.

Example 5: Carbon Dioxide Separations from Methane Using the Composite Membrane

Composite membrane samples from Example 2 were tested for CO$_2$/CH$_4$ mixed gas separation at ambient temperature (20-25° C.) at a feed pressure of 60 psig, 40% CO$_2$ feed concentration, and near atmospheric permeate pressure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A separation article comprising a first surface and a second surface and a layer comprising an amorphous cross-linked fluorinated copolymer adjacent to at least one of the first surface or the second surface,
   wherein the amorphous crosslinked fluorinated copolymer is produced by (a) copolymerizing one or more fluorinated ring monomers in the amount of 1 mol % to 99.5 mol %, wherein the fluorinated ring monomer is at least a five membered ring, and a crosslinker in the amount of from 0.2 mol % to 40 mol % to produce a first copolymer and (b) crosslinking the first copolymer to produce the amorphous crosslinked fluoropolymer.

2. The separation article of claim 1, wherein the fluorinated ring monomer is perfluorinated.

3. The separation article of claim 1, wherein the fluorinated ring monomer is an olefinic compound.

4. The separation article of claim 1, wherein the fluorinated ring monomer comprises a five or six membered ring.

5. The separation article of claim 1, wherein the fluorinated ring monomer is produced by a cyclopolymerization of a linear monomer that has an olefin on one end of the monomer and a vinyl ether on the other end of the monomer.

6. The separation article of claim 1, wherein the fluorinated ring monomer comprises one or more of the following compounds:

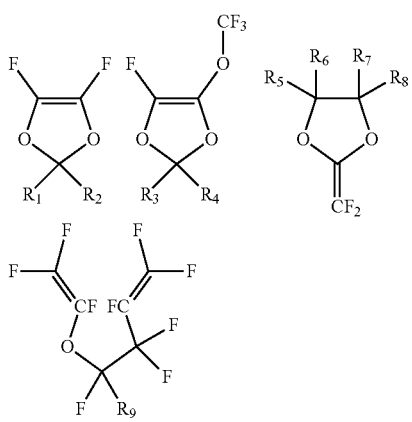

wherein

R$_1$ and R$_2$ are independently F, CF$_3$, CF$_2$CF$_3$, CF$_2$H, CF$_2$CF$_2$H, CFHCF$_3$, CFHCF$_2$H;

R$_3$ and R$_4$ are independently F, CF$_3$, or CF$_2$CF$_3$, CF$_2$H, CF$_2$CF$_2$H, CFHCF$_3$, CFHCF$_2$H;

R$_5$, R$_6$, R$_7$, and R$_8$ are independently F, CF$_3$, or CF$_2$CF$_3$, CF$_2$H, CF$_2$CF$_2$H, CFHCF$_3$, CFHCF$_2$H and R$_6$ and R$_7$ can be contained within a 5- or 6-membered ring; and R$_9$ is F, CF$_3$, or CF$_2$CF$_3$.

7. The separation article of claim 1, wherein the fluorinated ring monomer is:

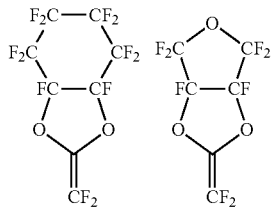

or a combination thereof.

8. The separation article of claim 1, wherein the fluorinated ring monomer is in the amount of 80 mol % to 99 mol %.

9. The separation article of claim 1, wherein the crosslinker comprises a perfluorinated olefinic compound comprising at least one crosslinkable group.

10. The separation article of claim 1, wherein the crosslinkable group comprises a photoactive group or a thermally active group.

11. The separation article of claim 9, wherein the crosslinkable group comprises an alkyl ester group, a cyano group, or a fluorinated vinyl ether group.

12. The separation article of claim 1, wherein the crosslinker comprises one or more compounds having the structure I-III:

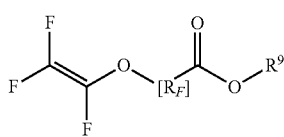

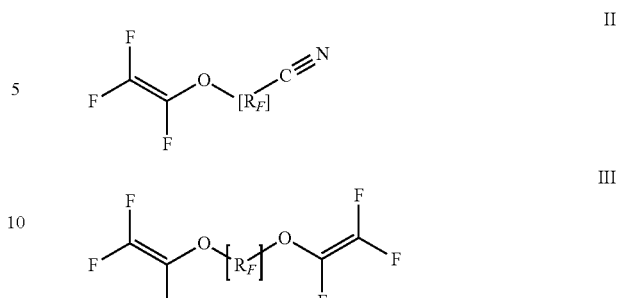

wherein R$_F$ is a perfluoroalkyl group having from 1 to 6 carbon atoms with optionally 1 or 2 ether oxygen atoms, and R$^9$ is a linear or branched alkyl group having from 1 to 6 carbon atoms.

13. The separation article of claim 1, wherein the crosslinker is:

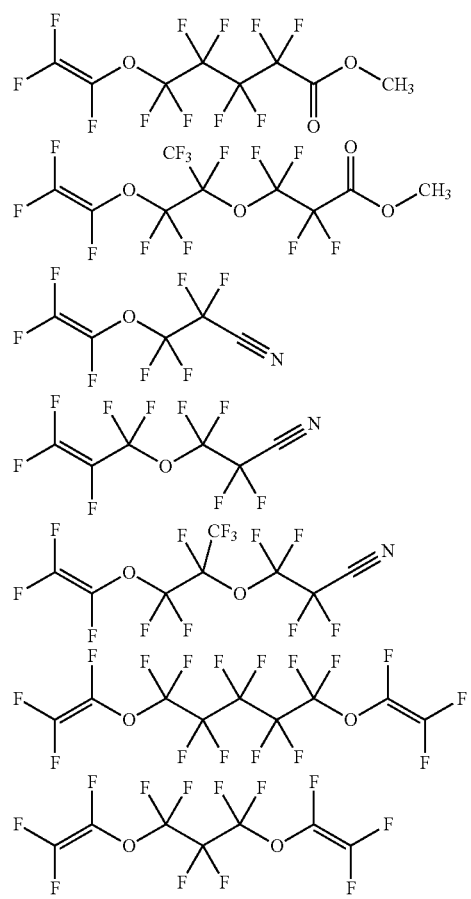

or any combination thereof.

14. The separation article of claim 1, wherein the crosslinker is in the amount of 0.2 mol % to 20 mol %.

15. The separation article of claim 1, wherein the fluorinated ring monomer comprises one or more of the following compounds:

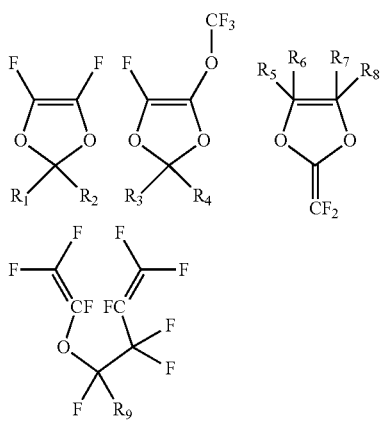

wherein
R₁ and R₂ are independently F, $CF_3$, $CF_2CF_3$, $CF_2H$, $CF_2CF_2H$, $CFHCF_3$, $CFHCF_2H$;
R₃ and R₄ are independently F, $CF_3$, or $CF_2CF_3$, $CF_2H$, $CF_2CF_2H$, $CFHCF_3$, $CFHCF_2H$;
R₅, R₆, R₇, and R₈ are independently F, $CF_3$, or $CF_2CF_3$, $CF_2H$, $CF_2CF_2H$, $CFHCF_3$, $CFHCF_2H$ and R₆ and R₇ can be contained within a 5- or 6-membered ring; and
R₉ is F, $CF_3$, or $CF_2CF_3$; and
the crosslinker comprises one or more compounds having the following structure:

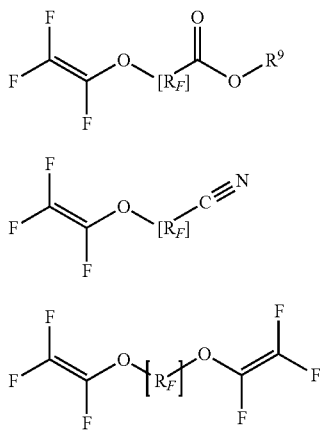

wherein $R_F$ is a perfluoroalkyl group having from 1 to 6 carbon atoms with optionally 1 or 2 ether oxygen atoms, and
$R^9$ is a linear or branched alkyl group having from 1 to 6 carbon atoms.

16. The separation article of claim 1, wherein the fluorinated ring monomer and the crosslinker are copolymerized with a third monomer comprising a fluorinated vinyl compound or a fluorinated vinyl ether compound.

17. The separation article of claim 16, wherein the third monomer has the structure:

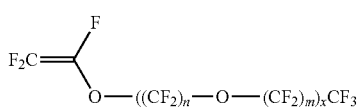

wherein n and m are independently 1, 2, or 3, and x is 1 or 2.

18. The separation article of claim 16, wherein the third monomer is

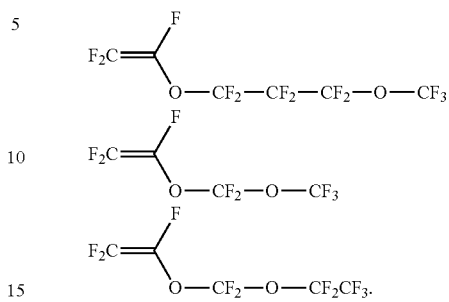

19. The separation article of claim 1, wherein the first copolymer is produced by solution or aqueous emulsion polymerization.

20. The separation article of claim 1, wherein the copolymerization is conducted in the presence of an initiator.

21. The separation article of claim 20, wherein the initiator comprises a hydrocarbon peroxide, a fluorocarbon peroxide, a hydrocarbon peroxydicarbonate, an inorganic fluorocarbon initiator, or any combination thereof.

22. The separation article of claim 1, wherein the first copolymer is crosslinked by exposing the first copolymer to UV radiation at a wavelength of less than 300 nm from about 0.5 hours to about 48 hours.

23. The separation article of claim 1, wherein the first copolymer is crosslinked by exposing the first copolymer to UV radiation at a wavelength of about 250 nm to about 300 nm from about 0.5 hours to about 48 hours.

24. The separation article of claim 1, wherein the first copolymer is crosslinked by heating the first copolymer at a temperature of from about 300° C. to about 350° C. for 0.5 minutes to 60 minutes.

25. The separation article of claim 1, wherein the amorphous crosslinked fluorinated copolymer has a glass transition temperature of from 0° C. to 300° C.

26. The separation article of claim 1, wherein the amorphous crosslinked fluorinated copolymer has a $M_n$ of from 10 kDa to 2,000 kDa.

27. The separation article of claim 1, wherein the amorphous crosslinked fluorinated copolymer has a $M_w$ of from 10,000 g/mol to 3,000,000 g/mol.

28. The separation article of claim 1, wherein the separation article comprises a multi-layer structured article, wherein at least one layer of the structure comprises the copolymer.

29. The separation article of claim 1, wherein the article comprises a film, membrane, tube, or fiber.

30. The separation article of claim 1, wherein the separation article comprises a layer of the amorphous crosslinked fluorinated copolymer, wherein the layer has a thickness of less than or equal to 1 μm.

31. A method for separating a first gaseous component from a gaseous mixture said process comprising passing the gaseous mixture across a separation article of claim 1.

32. The method of claim 31, wherein the method comprises
(a) passing the gaseous mixture across the separation article having a feed side and a permeate side, the separation article having the layer that is selectively permeable to at least the first gaseous component, said selective layer comprising the amorphous crosslinked fluorinated copolymer;

(b) providing a driving force sufficient to provide for permeation of at least a portion of the gaseous mixture from the feed side to the permeate side of the separation article, resulting in a gaseous permeate stream on the permeate side of the separation article and a gaseous retentate stream on the feed side of the separation article, wherein the gaseous permeate stream comprises the first gaseous component.

33. The method of claim 32, wherein the permeate stream has a concentration of first component that is greater than a concentration of the first component in the retentate stream.

34. The method of claim 32, further comprising withdrawing the permeate stream from the permeate side of the separation article.

35. The method of claim 32, further comprising withdrawing the retentate stream from the feed side of the separation article.

36. The method of claim 32, wherein the first gaseous component is carbon dioxide, hydrogen sulfide, helium, or any combination thereof.

37. The method of claim 32, wherein the gaseous mixture comprises methane and carbon dioxide.

38. The method of claim 32, wherein more than about 50% or more of the first gaseous component in the gaseous mixture permeates through the separation article.

* * * * *